(12) United States Patent
Sasaki

(10) Patent No.: US 11,113,141 B2
(45) Date of Patent: Sep. 7, 2021

(54) MESSAGE INPUT/OUTPUT DEVICE, METHOD, AND RECORDING MEDIUM

(71) Applicant: NEC Corporation, Tokyo (JP)

(72) Inventor: Hirohito Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 16/634,667

(22) PCT Filed: Aug. 1, 2018

(86) PCT No.: PCT/JP2018/028886
§ 371 (c)(1),
(2) Date: Jan. 28, 2020

(87) PCT Pub. No.: WO2019/026968
PCT Pub. Date: Feb. 7, 2019

(65) Prior Publication Data
US 2021/0124634 A1 Apr. 29, 2021

(30) Foreign Application Priority Data
Aug. 4, 2017 (JP) .............................. JP2017-151500

(51) Int. Cl.
G06F 11/00 (2006.01)
G06F 11/07 (2006.01)
G06F 11/32 (2006.01)

(52) U.S. Cl.
CPC ........ *G06F 11/079* (2013.01); *G06F 11/0709* (2013.01); *G06F 11/0748* (2013.01); *G06F 11/32* (2013.01)

(58) Field of Classification Search
None
See application file for complete search history.

(56) References Cited

U.S. PATENT DOCUMENTS

| 2010/0177344 | A1 | 7/2010 | Matsumoto |
| 2017/0063496 | A1* | 3/2017 | Shiraishi .............. G11C 29/022 |
| 2017/0170951 | A1* | 6/2017 | Ito ..................... H04L 12/40143 |
| 2018/0167478 | A1* | 6/2018 | Zhu ........................ G06F 3/0481 |
| 2019/0200343 | A1* | 6/2019 | Song ........................ G06F 9/50 |

FOREIGN PATENT DOCUMENTS

| JP | H05-95357 A | 4/1993 |
| JP | 2007-080035 A | 3/2007 |
| JP | 2008-269401 A | 11/2008 |

(Continued)

OTHER PUBLICATIONS

Google Scholar/Patents—text refined (Year: 2021).*

(Continued)

*Primary Examiner* — Christopher S McCarthy
(74) *Attorney, Agent, or Firm* — Sughrue Mion, PLLC

(57) ABSTRACT

In order to enable to output a final state of a message while reducing output of a message, a message input/output method includes: receiving a reception message; and outputting, when a reception time of the reception message falls within a first predetermined time from reception of a related message related to the reception message, the reception message when a next of the related message is not received within a second predetermined time exceeding the first predetermined time from the reception time.

18 Claims, 11 Drawing Sheets

(56) References Cited

FOREIGN PATENT DOCUMENTS

| | | |
|---|---|---|
| JP | 2010-161714 A | 7/2010 |
| JP | 2012-118876 A | 6/2012 |
| JP | 2015-191327 A | 11/2015 |

OTHER PUBLICATIONS

International Search Report for PCT Application No. PCT/JP2018/028886, dated Oct. 30, 2018.
English translation of Written opinion for PCT Application No. PCT/JP2018/028886.

* cited by examiner

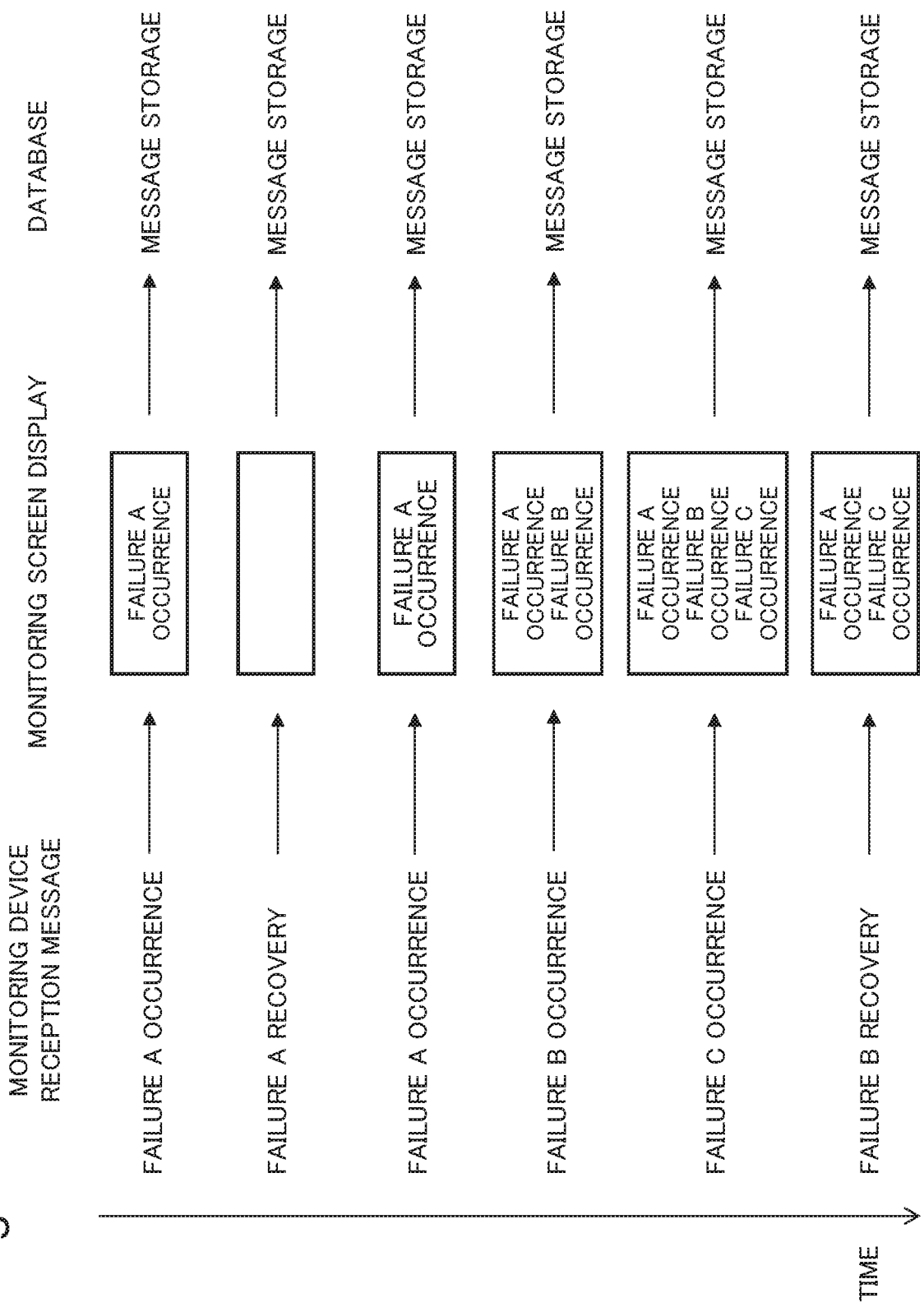

MESSAGE INPUT/OUTPUT DEVICE, METHOD, AND RECORDING MEDIUM

This application is a National Stage Entry of PCT/JP2018/028886 filed on Aug. 1, 2018, which claims priority from Japanese Patent Application 2017-151500 filed on Aug. 4, 2017, the contents of all of which are incorporated herein by reference, in their entirety.

TECHNICAL FIELD

The present invention relates to a message input/output device that outputs a message input from another device, a method, and a recording medium.

BACKGROUND ART

FIG. 11 is a configuration example of a monitoring system. This monitoring system includes three monitored devices constituting a network, a monitoring device that monitors an operation of each of the monitored devices, and a monitoring display that displays a monitoring situation. Each monitored device transmits a message including a state of the network and the monitored device to the monitoring device. Further, the monitoring device stores a history of a message received from a monitored device into a database.

FIG. 12 is a diagram illustrating an example of a relation among a reception message of a monitoring device, display of a monitoring screen, and a message stored in a database. In this example, a vertical axis is designated as a time axis, and a content of a message received by the monitoring device, display of the monitoring screen, and a message stored in the database are abstractly illustrated. Note that, in this example, it is assumed that a message is transmitted from only one monitored device.

First, the monitoring device displays, when receiving a message "failure A occurrence", "failure A occurrence" on the monitoring screen and stores the reception message in the database.

Next, the monitoring device deletes, when receiving a message "failure A recovery", the display of "failure A occurrence" on the monitoring screen. In this manner, until the monitoring device receives a message of recovery, the monitoring screen continues to display a message indicating that a failure is occurring.

It is assumed that, in such a monitoring system, a malfunction in which a failure and a recovery are alternately repeated in a short time occurs in a monitored device. At that time, the monitored device alternately outputs a failure occurrence message and a recovery message in a short time and the state is continued until repair completion of the monitored device.

In a state where a large number of messages are transmitted from a monitored device in this manner, the following problems are produced.

When display/deletion of a display of a failure occurrence on the monitoring screen is repeated in a short time, it is difficult for a monitoring person to notice the failure occurrence.

When the monitoring screen displays a large number of messages, another monitored device and another type of message are buried in the large number of messages and therefore a monitoring person may not always notice such a buried message.

A message volume stored in the database becomes enlarged. When a message history being unnecessary after an elapse of a certain period from message reception is deleted from the database, the number of items to be deleted is large, and therefore a processing load due to deletion increases and it becomes difficult to normally execute another type of stationary processing.

In contrast, in a method described in PTL 1, when a received failure report is a related report of a failure report previously received, a notification to a system administrator is omitted.

Further, in a method described in PTL 2, data received during timer operation are written in a data storage table, and after timer termination, data of a second case and thereafter are determined as being exempt from processing with respect to data having the same failure content in the same occurrence place.

In these methods, processing for a large number of messages is reduced, and thereby the above-described problems can be solved.

CITATION LIST

Patent Literature

[PTL 1] Japanese Unexamined Patent Application Publication No. 2007-080035
[PTL 2] Japanese Unexamined Patent Application Publication No. H05-095357

SUMMARY OF INVENTION

Technical Problem

However, in the methods described in PTL 1 and PTL 2, when messages related to each other are received within a predetermined time, a notification of a related message is inhibited. Therefore, when a failure message and a recovery message are handled as a related message, it is difficult for a monitoring device to notify a monitoring person of a final state and store the final state in a database when a monitored device is repeatedly subjected to a failure and a recovery.

An object of the present invention is to provide a message input/output device, a method, and a recording medium, being capable of outputting a final state of a message while reducing output of a message.

Solution to Problem

For settling the above-mentioned problem, a message input/output device of the present invention comprises: a message reception means for receiving a reception message; and an output means for outputting, when a reception time of the reception message falls within a first predetermined time from reception of a related message related to the reception message, the reception message when a next of the related message is not received within a second predetermined time exceeding the first predetermined time from the reception time.

And, a message input/output method of the present invention comprises: receiving a reception message; and outputting, when a reception time of the reception message falls within a first predetermined time from reception of a related message related to the reception message, the reception message when a next of the related message is not received within a second predetermined time exceeding the first predetermined time from the reception time.

And, a computer readable recording medium is recorded with a message input/output program of the present invention, the program causing a computer to execute: a message reception function of receiving a reception message; and an output function of outputting, when a reception time of the reception message falls within a first predetermined time from reception of a related message related to the reception message, the reception message when a next of the related message is not received within a second predetermined time exceeding the first predetermined time from the reception time.

Advantageous Effects of Invention

According to the message input/output device, the method, and the recording medium of the present invention, a final state of a message can be output while reducing output of a message.

BRIEF DESCRIPTION OF DRAWINGS

FIG. 12 shows a diagram illustrating an example of a relation among a reception message of a monitoring device, display of a monitoring screen, and a message stored in a database.

EXAMPLE EMBODIMENT

First Example Embodiment

A first example embodiment of the present invention is described.

Figure 1:
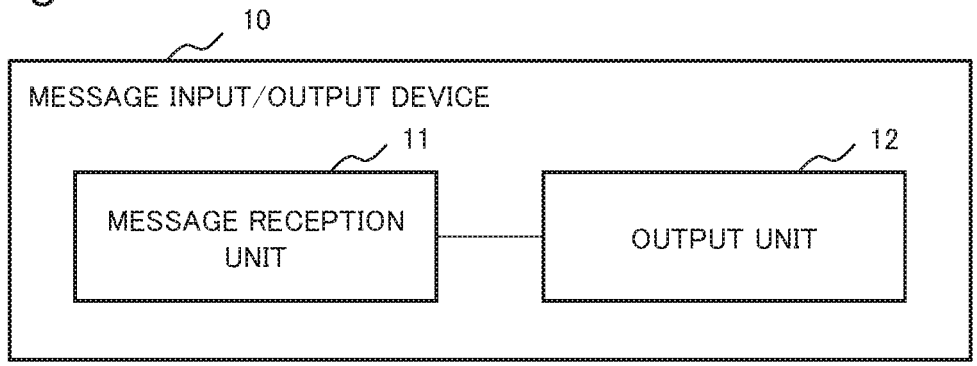
FIG. 1 shows a diagram illustrating a configuration example of a message input/output device of a first example embodiment of the present invention.

FIG. 1 illustrates a configuration example of a message input/output device 10 of the present example embodiment.

The message input/output device 10 of the present example embodiment includes a message reception unit 11 and an output unit 12.

The message reception unit 11 is a portion that receives a reception message.

The output unit 12 is a portion that outputs, when a reception time of a reception message falls within a first predetermined time from reception of a related message related to the reception message, the reception message when a next related message is not received within a second predetermined time from the reception time. Note that the second predetermined time is a time exceeding the first predetermined time.

When the message input/output device 10 is configured as described above, the message input/output device 10 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 10 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

Figure 2:
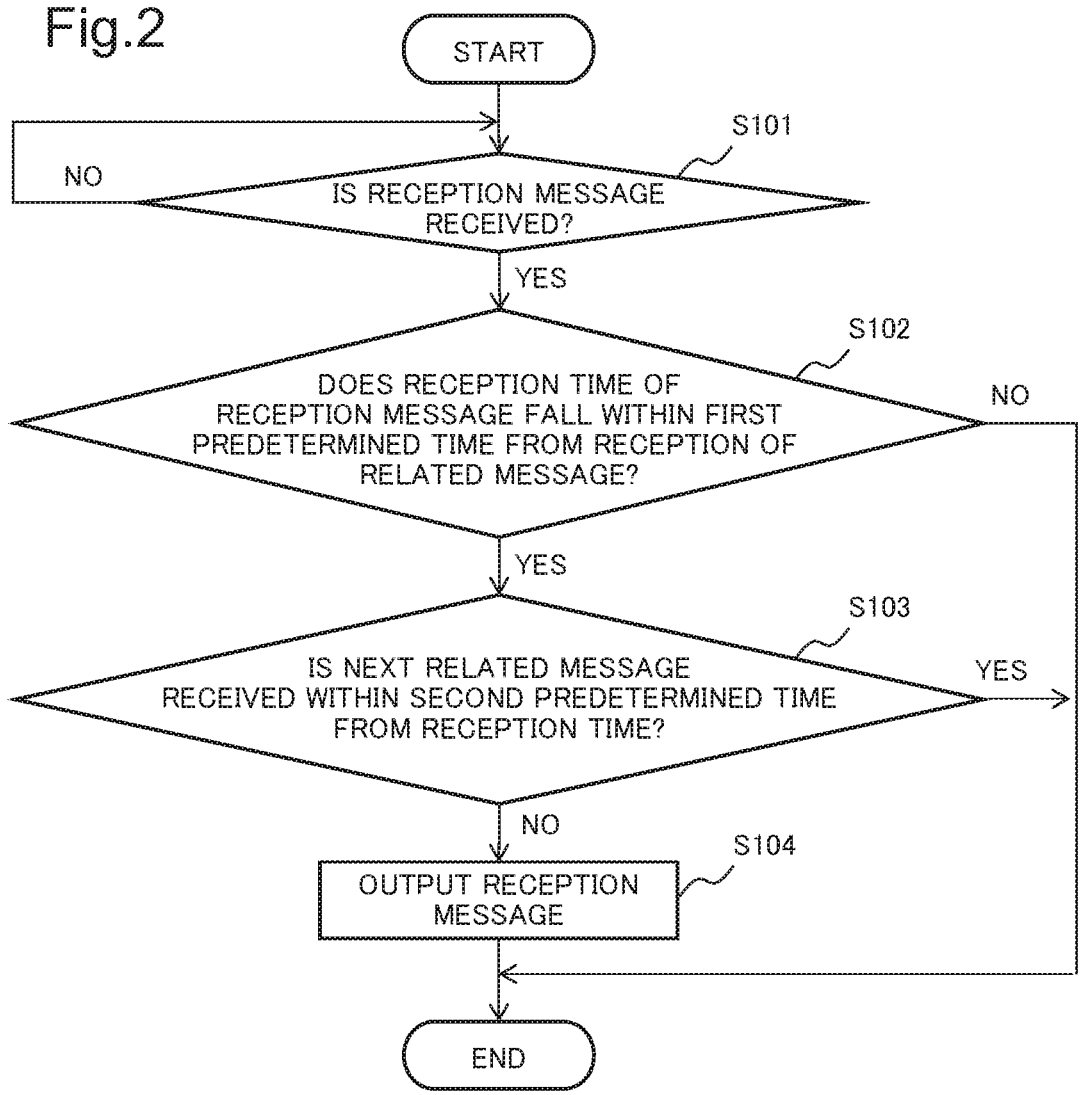
FIG. 2 shows a diagram illustrating an operation example of the message input/output device of the first example embodiment of the present invention.

Next, FIG. 2 illustrates an example of an operation of the message input/output device 10 of the present example embodiment.

First, the message reception unit 11 receives a reception message (YES in step S101).

Next, the output unit 12 confirms, when a reception time of the reception message falls within a first predetermined time from reception of a related message (YES in step S102), whether a next related message is received within a second predetermined time from the reception time. When a next related message is not received within the second predetermined time from the reception time (NO in step S103), the reception message is output (step S104).

By proceeding as described above, the message input/output device 10 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 10 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

As described above, according to the first example embodiment of the present invention, the message input/output device 10 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 10 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

Second Example Embodiment

Next, a second example embodiment of the present invention is described. According to the present example embodiment, a specific example of the message input/output device 10 is described.

Figure 3:
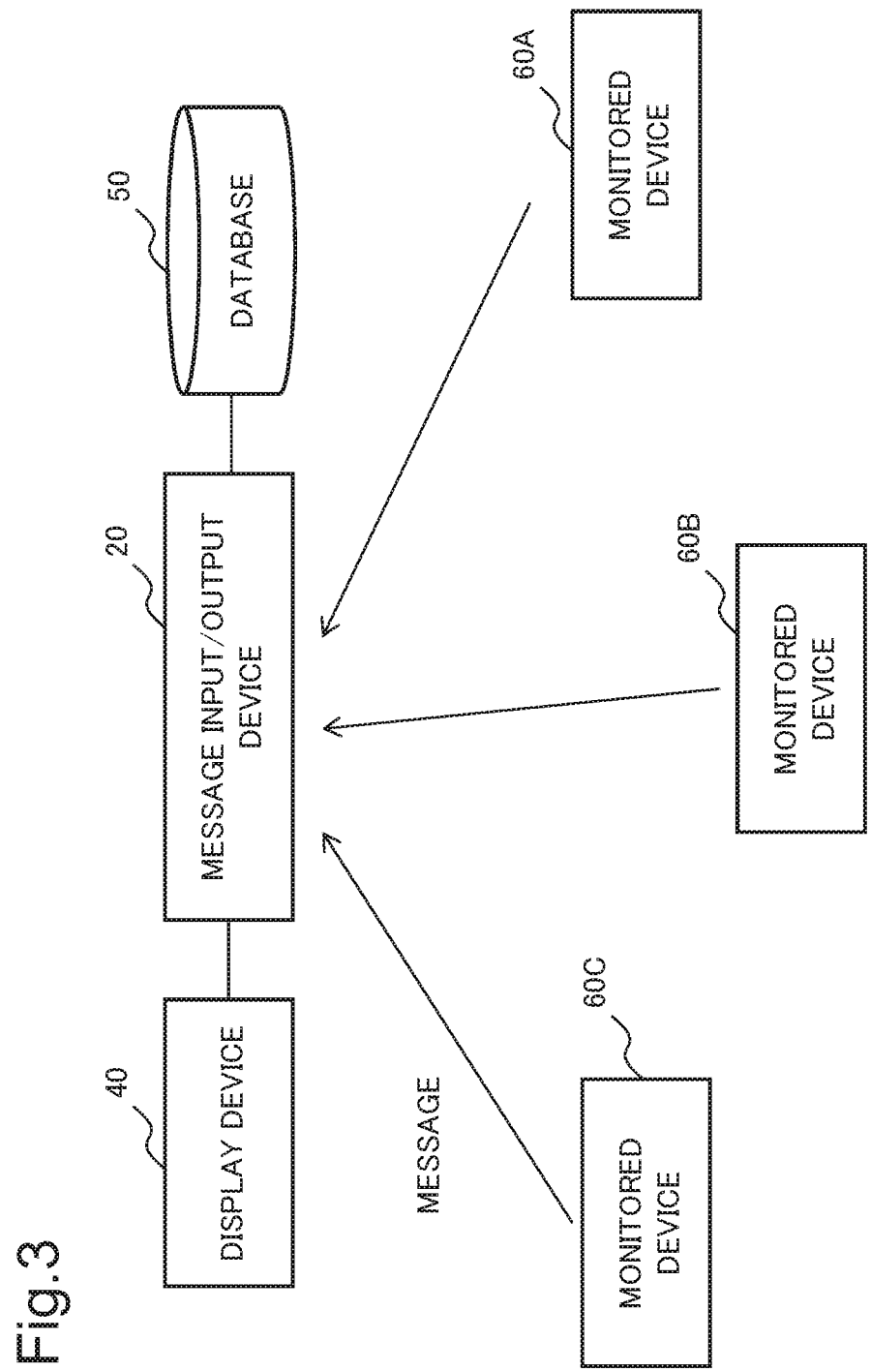
FIG. 3 shows a diagram illustrating a configuration example of a message input/output system of a second example embodiment of the present invention.

First, FIG. 3 illustrates a configuration example of a message input/output system of the present example embodiment.

The message input/output system of the present example embodiment includes a message input/output device 20, a display device 40, a database 50, and a monitored device 60 (60A, 60B, and 60C).

The display device 40 is a device that displays a content of a message received by the message input/output device 20 from the monitored device 60. The display device 40 displays, when receiving, for example, a message relating to a failure, the message of the failure until receiving a recovery message paired with the message. The display device 40 can display a message other than the message relating to the failure.

The database 50 is a device that stores a history of a message received by the message input/output device 20 from the monitored device 60. The database 50 stores a message received from the monitored device 60 for a certain period, and a maintenance person can browse a message history by referring to the database 50.

The message input/output device 20 is a device that receives a message from the monitored device 60 and outputs the received message to the display device 40 and the database 50. The display device 40 and the database 50 may be located inside or outside the message input/output device 20.

The monitored device 60 is a device that transmits a message including a state of the monitored device 60 to the message input/output device 20. The monitored device 60 transmits, when, for example, a change or a failure occurs in an operation of the monitored device 60 itself, a message to the message input/output device 20 that monitors the monitored device 60 itself. The monitored device 60 is, for example, a network device such as a router, a switch, and the like. Further, there may be one or more monitored devices 60 in a message input/output system.

Figure 4:
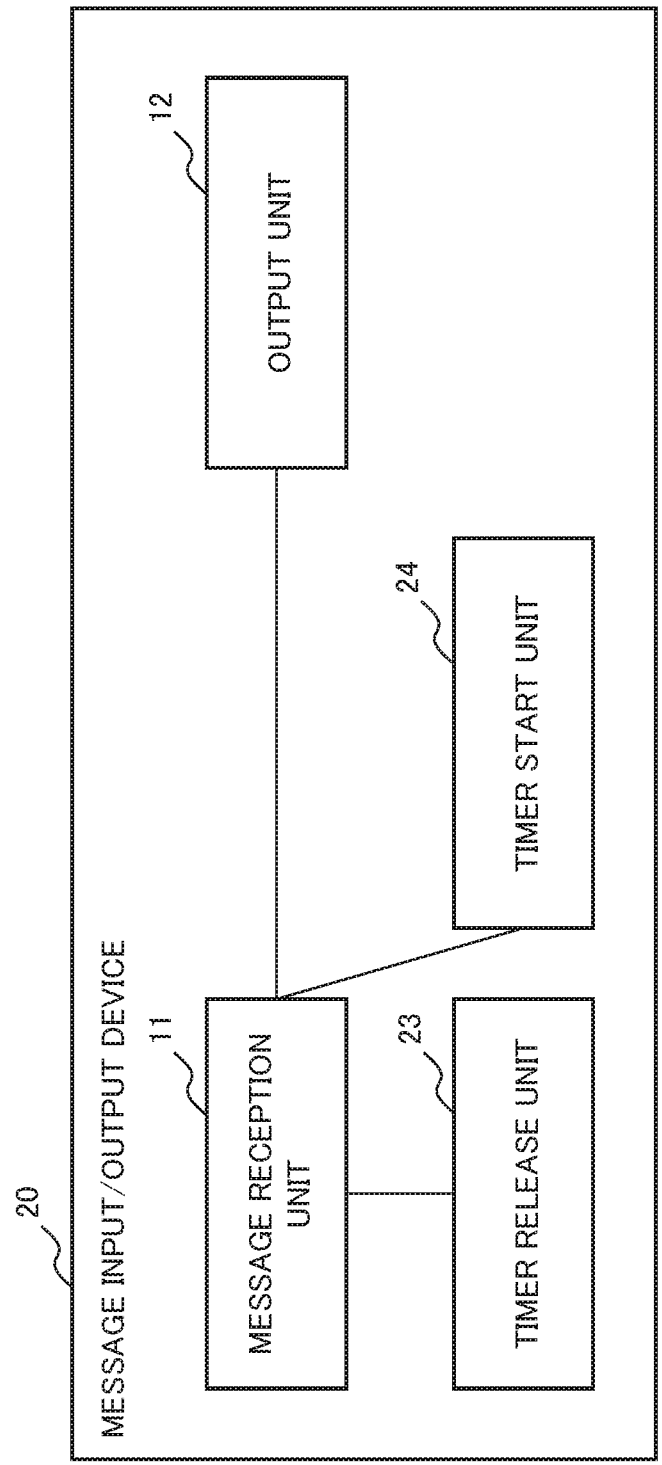
FIG. 4 shows a diagram illustrating a configuration example of a message input/output device of the second and a third example embodiment of the present invention.

Next, by using FIG. 4, a configuration example of the message input/output device 20 of the present example embodiment is described. The message input/output device 20 of the present example embodiment includes a message reception unit 11, an output unit 12, a timer release unit 23, and a timer start unit 24.

The message reception unit 11 is a portion that receives a reception message from the monitored device 60.

The timer release unit 23 is a portion that releases, when a timer of a related message is started, the timer when receiving a reception message.

A related message is a message related to a reception message. According to the present example embodiment, it is assumed that the message input/output device 20 previously acquires an association relation between messages.

Further, according to the present example embodiment, it is assumed that a failure message and a recovery message corresponding to the failure that are paired are associated as a related message. Further, it is assumed that the message input/output device 20 of the present example embodiment handles, as a related message, a failure message and a recovery message from the same monitored device 60.

Further, with regard to a related message, two or more messages can be associated. When, for example, a plurality of messages are transmitted for one failure, these messages can be associated as a related message.

The timer start unit 24 is a portion that starts a timer when a reception time of a reception message falls within a first predetermined time from reception of a related message. This timer is started based on a group unit of a related message. When, for example, messages M1 and M2 are associated in a group G1 of a related message, messages M3 and M4 are associated in a group G2 thereof, and a reception message is the message M3, the timer start unit 24 starts a timer for the group G2. Further, this timer is a timer for measuring a second predetermined time larger than the first predetermined time.

The output unit 12 is a portion that outputs a reception message when a timer is timed out. Further, the output unit 12 of the present example embodiment outputs a reception message when a reception time of the reception message exceeds a first predetermined time from reception of a related message. Note that, according to the present example embodiment, it is assumed that an output destination of a message includes the display device 40 and the database 50.

By doing as above, the message input/output device 20 reduces output of a reception message while receiving a related message at an interval of a first predetermined time or less. When a next related message is not received within a second predetermined time exceeding the first predetermined time (that is, when a timer is timed out), a reception message received last is output.

Further, the output unit 12 may output a reception message when not receiving, even in a period in which a related message is received at an interval of a first predetermined time or less, a related message having the same content as the reception message in the period. Further, whether to output a message at this timing may be set by a user.

When the message input/output device 20 is configured as described above, the message input/output device 20 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 20 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

Figure 5:
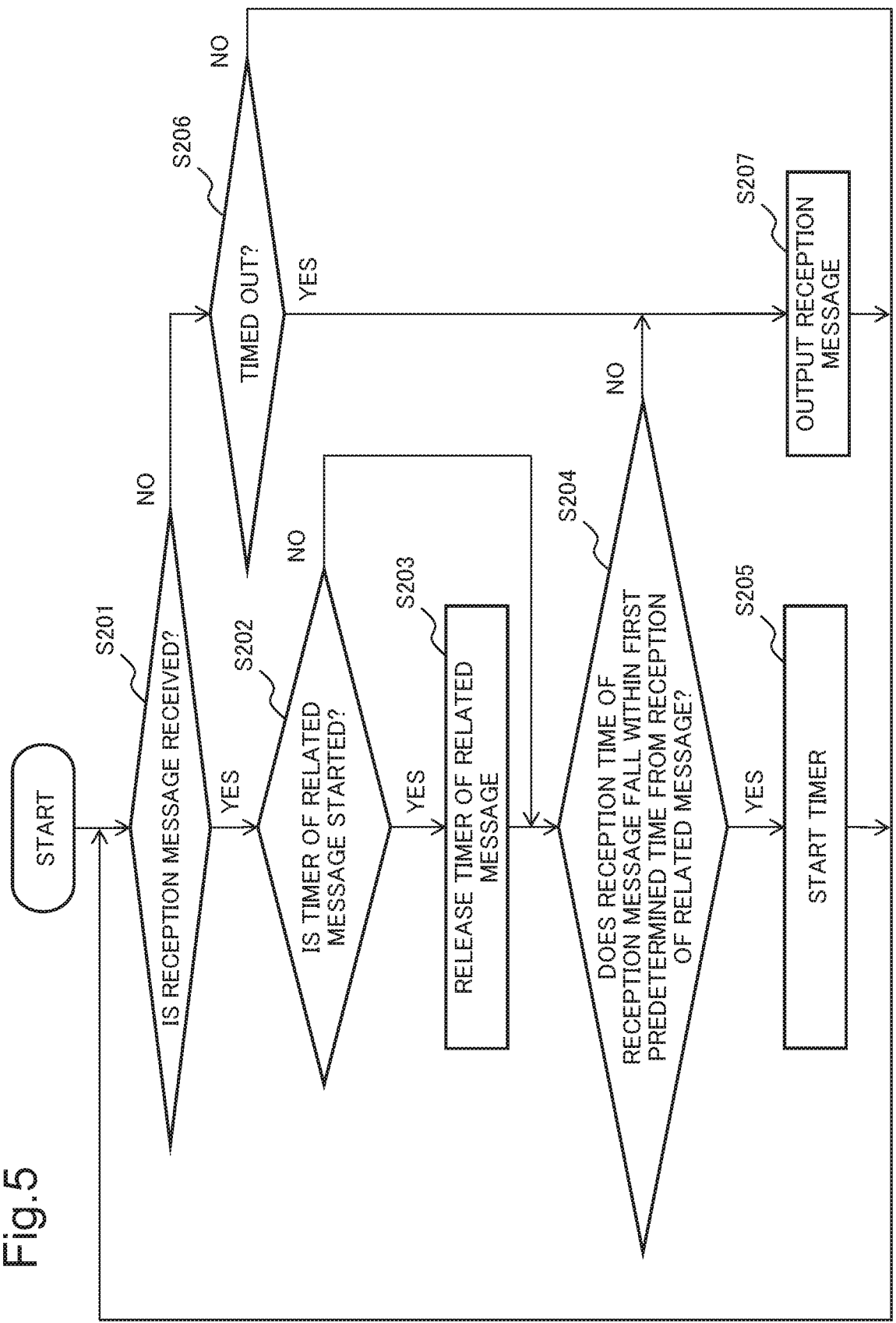
FIG. 5 shows a diagram illustrating an operation example of the message input/output device of the second example embodiment of the present invention.
Figure 6:
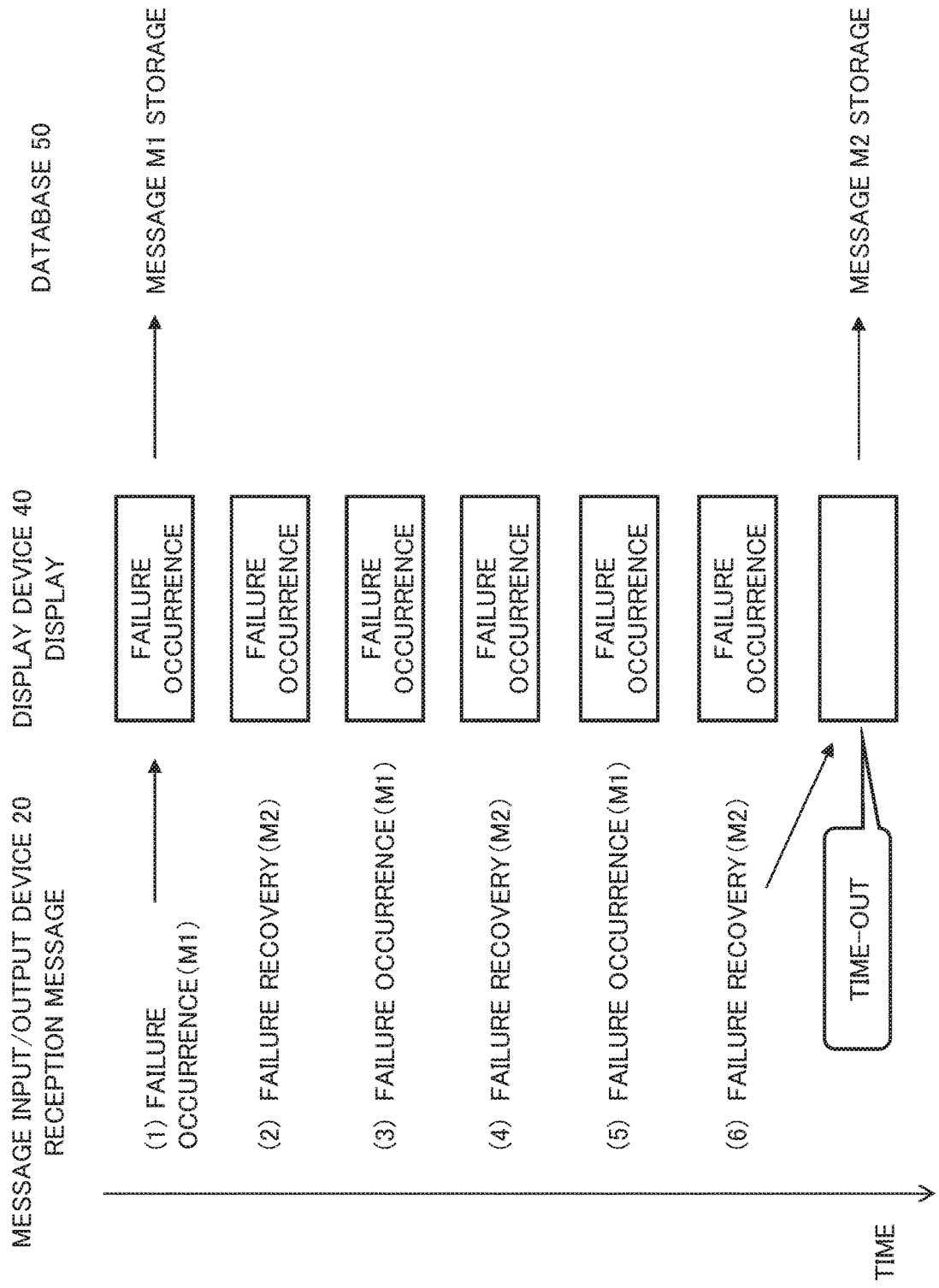
FIG. 6 shows a diagram illustrating an example of a relation among a reception message of the message input/output device of the second example embodiment of the present invention, display of a display device, and a message stored in a database.

Next, by using FIGS. 5 and 6, an operation example of the message input/output device 20 of the present example embodiment is described. FIG. 5 is a diagram illustrating an operation example of the message input/output device 20 of the present example embodiment. FIG. 6 is a diagram illustrating a relation among a reception message of the message input/output device 20, display of the display device 40, and a message stored in the database 50.

It is assumed that the message input/output device 20 previously acquires a pair of a message M1 (failure message) and a message M2 (recovery message) as a related message. Further, for simplification, according to the present example embodiment, it is assumed that a message is transmitted from only the monitored device 60A. Further, it is assumed that the display device 40 continues to display a failure occurrence until receiving a recovery message.

First, when the message input/output device 20 receives a message M1 in (1) of FIG. 6 (YES in step S201 of FIG. 5), a timer of a related message has not been started (NO in step S202). Further, since a related message has not been received within a first predetermined time before the reception of the message M1 (NO in step S204), the message input/output device 20 outputs the received message M1 to the display device 40 and the database 50 (step S207). The display device 40 displays a fact that a failure has occurred, and the database 50 stores the message M1.

Next, when a message M2 is received within a first predetermined time from reception (1) of a message M1 in (2) of FIG. 6 (YES in step S201), a timer of a related message has not been started (NO in step S202). Further, since a reception time of the message M2 falls within a first predetermined time from reception of a related message (message M1) (YES in step S204), a timer is started (step S205). At that time, the message input/output device 20 does not output the message M2 to the display device 40 or the database 50. Therefore, display of the display device 40 is continued as display indicating a failure occurrence, and the database 50 does not store the message M2.

Next, when a message M1 is received within a first predetermined time from reception (2) of a message M2 in (3) of FIG. 6 (YES in step S201), a timer of a related message has been started (YES in step S202). Therefore, the message input/output device 20 releases the timer of the related message (step S203). Further, since a reception time of the message M1 falls within a first predetermined time from reception of a related message (message M2) (YES in step S204), a timer is started (step S205). At that time, the message input/output device 20 does not output the message M1 to the display device 40 or the database 50.

An operation of (4) and (5) of FIG. 6 is similar to the operation of (3), and therefore description thereof is omitted.

When a message M2 is received within a first predetermined time from reception of a message M1 (5) in (6) of FIG. 6 (YES in step S201), a timer of a related message has been started (YES in step S202). Therefore, the message input/output device 20 releases the timer of the related message (step S203). Further, since a reception time of the message M2 falls within a first predetermined time from reception of a related message (message M1) (YES in step S204), a timer is started (step S205). At that time, the message input/output device 20 does not output the message M1 to the display device 40 or the database 50.

When the timer is timed out (NO in step S201, YES in step S206). the message input/output device 20 outputs a latest reception message M2 (step S207). The display device 40 clears display of a failure occurrence, and the database 50 stores the message M2.

In this manner, the message input/output device 20 reduces output of a reception message while receiving a related message at an interval of a first predetermined time or less. When a next related message is not received within a second predetermined time exceeding a first predetermined time (when a timer is timed out), a reception message received last is output.

Figure 7:
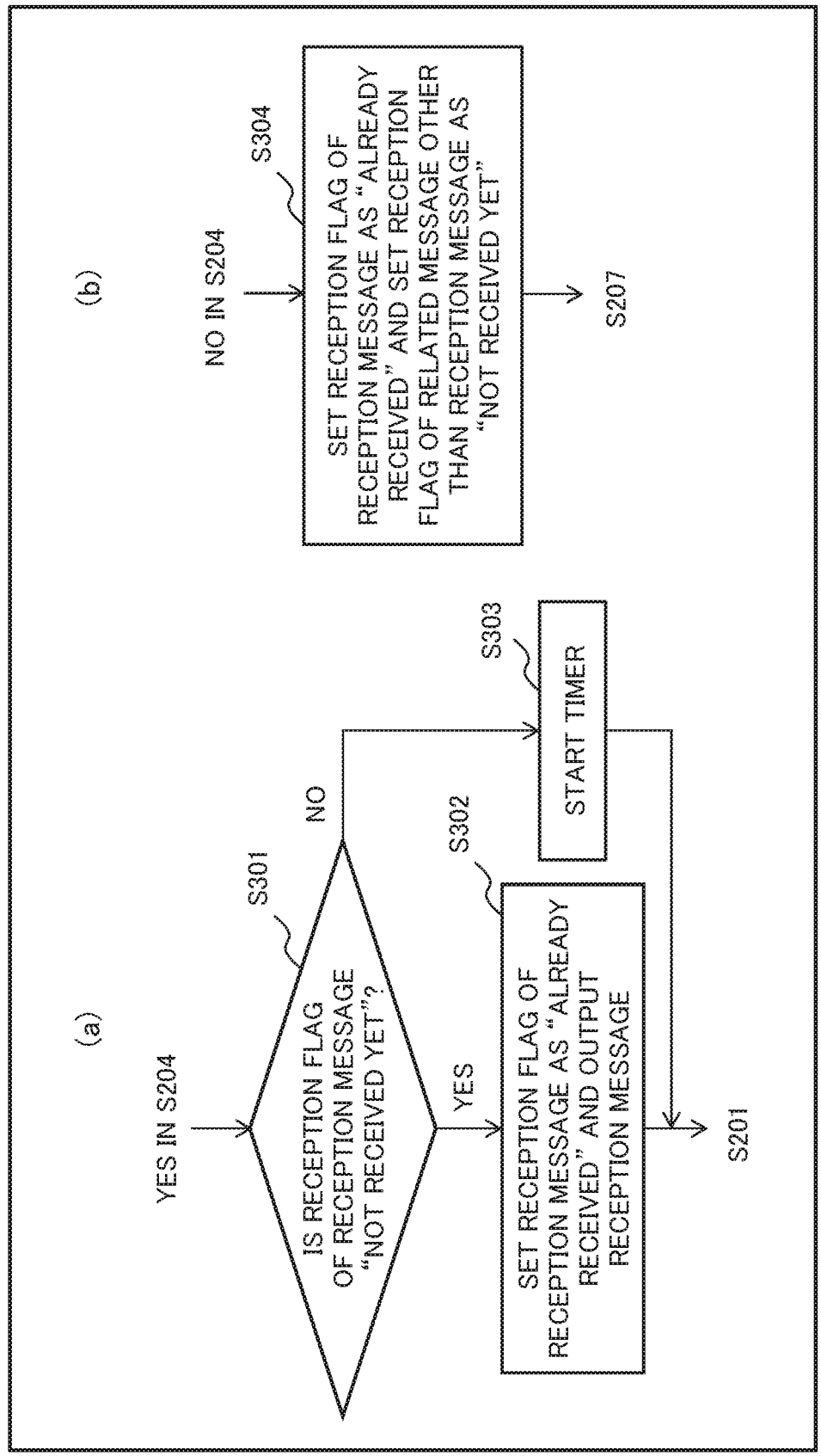
FIG. 7 shows a diagram illustrating an operation example of the message input/output device of the second example embodiment of the present invention.

Next, FIG. 7 illustrates another operation example of the message input/output device 20 of the present example embodiment. In this operation example, even in a period in which a related message is received within a first predetermined time, the message input/output device 20 outputs a reception message when not receiving a related message having the same content as the reception message in the period.

(a) of FIG. 7 is an example of an operation executed by the message input/output device 20, instead of step S205 in FIG. 5. Further, (b) of FIG. 7 is an example of an operation executed by the message input/output device 20 between step S204 and step S207 in FIG. 5.

Figure 8:
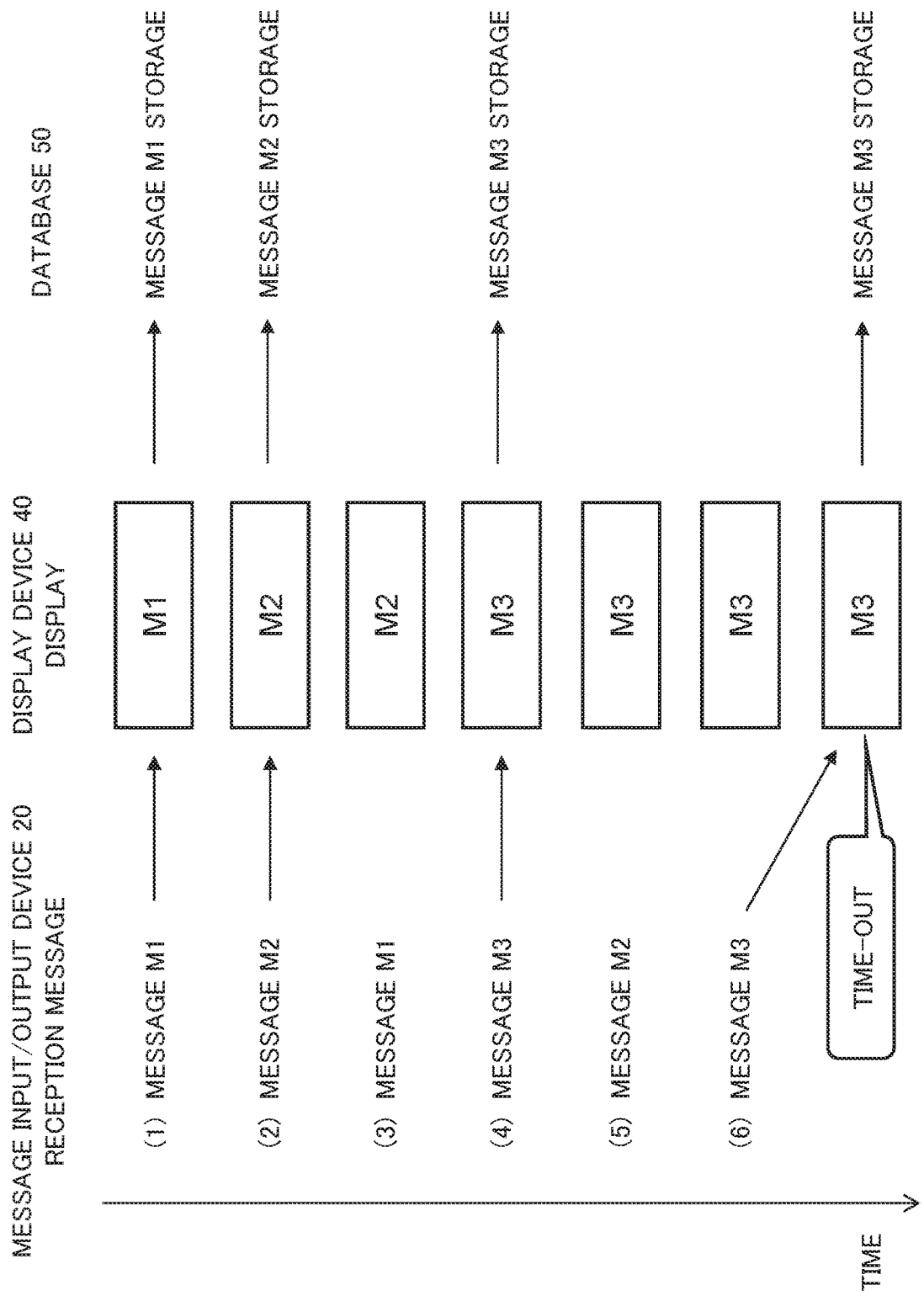
FIG. 8 shows a diagram illustrating an example of a relation among a reception message of the message input/output device of the second example embodiment of the present invention, display of a display device, and a message stored in a database.

Further, FIG. 8 illustrates an example of a relation among a reception message of the message input/output device 20, display of the display device 40, and a message stored in the database 50. It is assumed that the message input/output device 20 acquires three messages M1, M2, and M3 as a related message. Further, it is assumed that the display device 40 continues to display a message having the same content until receiving a next message.

First, when the message input/output device 20 receives a message M1 in (1) of FIG. 8 (YES in step S201 of FIG. 5), a timer of a related message has not been started (NO in step S202). Further, since a related message has not been received within a first predetermined time before the reception of the message M1 (NO in step S204), the message input/output device 20 outputs the received message M1 to the display device 40 and the database 50 (step S207).

Further, the message input/output device 20 sets, before step S207, a reception flag of the received message M1 as "already received" and sets a reception flag of a related message (M2 and M3) other than the message M1 as "not received yet" (step S304 in FIG. 7). Note that, a reception flag indicates, in a period in which a related message is received within a first predetermined time, presence or absence of reception of the message. The display device 40 displays a fact that the message M1 is received and the database stores the message M1.

Next, when a message M2 is received within a first predetermined time from reception (1) of a message M1 in (2) of FIG. 8 (YES in step S201 of FIG. 5), a timer of a related message has not been started (NO in step S202). Further, a reception time of a message M2 falls within a first predetermined time from reception of a related message (message M1) (YES in step S204) and a reception flag of the message M2 is "not received yet" (YES in step S301 of FIG. 7). Therefore, the reception flag of the message M2 is set as "already received" and the message M2 is output (step S302). The display device 40 displays a fact that the message M2 is received and the database 50 stores the message M2.

Next, when a message M1 is received within a first predetermined time from reception (2) of a message M2 in (3) of FIG. 8 (YES in step S201), a timer of a related message has not been started (NO in step S202). Further, a reception time of the message M1 falls within a first predetermined time from reception of a related message (message M2) (YES in step S204) and a reception flag of the message M1 is "already received" (NO in step S301 of FIG. 7). Therefore, the message input/output device 20 starts a timer (step S303). At that time, the message input/output device 20 does not output the message M1 to the display device 40 or the database 50.

Next, when a message M3 is received within a first predetermined time from reception (3) of a message M1 in (4) of FIG. 8 (YES in step S201 of FIG. 5), a timer of a related message has been started (YES in step S202). Therefore, the message input/output device 20 releases the timer (step S203).

Further, a reception time of the message M3 falls within a first predetermined time from reception of a related message (message M1) (YES in step S204) and a reception flag of the message M3 is "not received yet" (YES in step S301 of FIG. 7). Therefore, the message input/output device 20 sets a reception flag of the message M3 as "already received" and outputs the message M3 (step S302). The display device 40 displays a fact that the message M3 is received, and the database 50 stores the message M3.

An operation in (5) of FIG. 8 is similar to the operation of (3), and therefore description thereof is omitted.

When a message M3 is received within a first predetermined time from reception of a message M2 (5) in (6) of FIG. 8 (YES in step S201), a timer of a related message has been started (YES in step S202). Therefore, the message input/output device 20 releases the timer of the related message (step S203). Further, a reception time of the message M3 falls within a first predetermined time from reception of a related message (message M2) (YES in step S204) and a reception flag of the message M3 is "already received" (NO in step S301). Therefore, the message input/output device 20 starts a timer (step S303). At that time, the message input/output device 20 does not output the message M3 to the display device 40 or the database 50.

When the timer is timed out (NO in step S201, YES in step S206), the message input/output device 20 outputs a latest reception message M3 (step S207). The display device 40 displays a fact that the message M3 is received, and the database 50 stores the message M3.

By proceeding as described above, the message input/output device 20 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 20 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

As described above, according to the second example embodiment of the present invention, the message input/output device 20 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 20 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

Third Example Embodiment

Next, a third example embodiment of the present invention is described. The present example embodiment is a form in which a function of outputting information indicating that output of a message is reduced is added to the message input/output device 20 of the second example embodiment.

First, by using FIG. 4, a configuration example of a message input/output device 20 of the present example embodiment is described. A message reception unit 11, a timer release unit 23, and a timer start unit 24 are similar to the second example embodiment, and therefore description thereof is omitted.

An output unit 12 of the present example embodiment outputs information indicating that output of a message is reduced at a predetermined timing, for example, periodically, in addition to the function of the second example embodiment.

The output unit 12 sets, when, for example, the timer start unit 24 starts a timer (when output of a reception message is reduced), a reduction flag indicating presence or absence of reduction of output of a message corresponding to a reception message as "reduction done". When a reduction flag is set as "reduction done", the output unit 12 outputs, at a predetermined timing, a fact that output of a reception message is reduced and clears the reduction flag to "no reduction".

Alternatively, the output unit 12 may count the number of output reductions, instead of a reduction flag. The output unit 12 adds, when the timer start unit 24 starts a timer, for example, 1 to the number of output reductions corresponding to a reception message. The output unit 12 outputs, when there is a reception message in which the number of output reductions is 1 or more, the number of output reductions for each reception message at a predetermined timing and clears the number of output reductions to 0.

When the message input/output device 20 is configured as described above, the message input/output device 20 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 20 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

Further, according to the present example embodiment, when output of a message is reduced, information indicating that output of a message is reduced and the number of output reductions are output. Thereby, also with regard to a message of which output is reduced, information thereof can be reported to a maintenance person.

Figure 9:
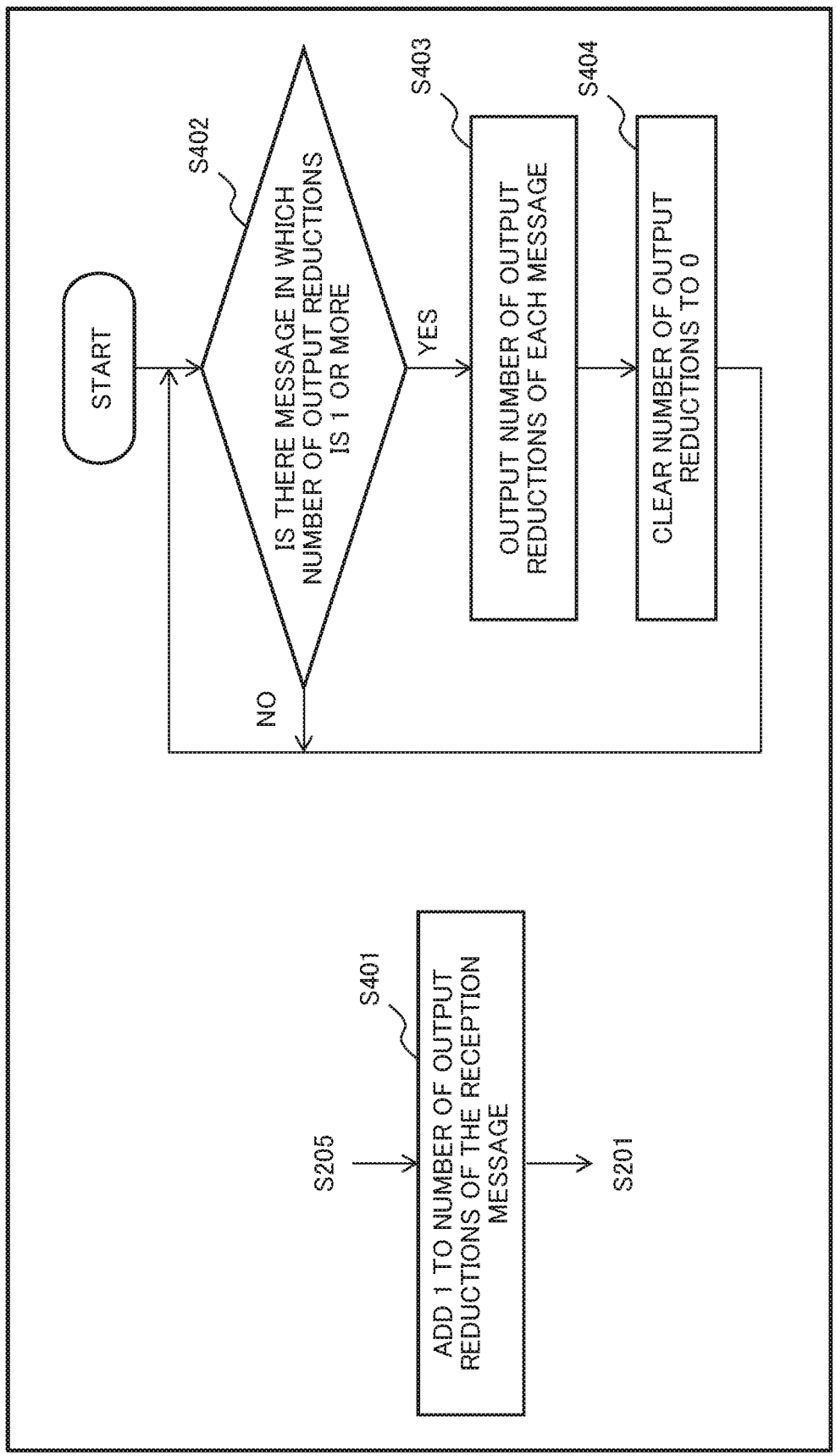
FIG. 9 shows a diagram illustrating an operation example of the message input/output device of the third example embodiment of the present invention.

Next, FIG. 9 illustrates an operation example of the message input/output device 20 of the present example embodiment. This operation example is an example of an operation added to the operation example (FIG. 5) of the second example embodiment. The operation example of FIG. 5 is similar to the second example embodiment, and therefore description thereof is omitted.

The message input/output device 20 of the present example embodiment adds, after starting a timer (step S205 in FIG. 5), 1 to the number of output reductions corresponding to a reception message received in step S201 (step S401 in FIG. 9).

Further, the message input/output device 20 outputs, when there is a message in which the number of output reductions is 1 or more (YES in step S402), information of a message in which the number of output reductions is 1 or more and the number of output reductions to the display device 40 and the database 50 at a predetermined timing (step S403). The message input/output device 20 clears the number of output reductions of each message to 0 (step S404). The display device 40 outputs information of a message subjected to reduction. Further, the database 50 stores information of a message subjected to reduction.

By proceeding as described above, the message input/output device 20 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 20 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

As described above, according to the third example embodiment of the present invention, the message input/output device 20 confirms whether a reception time of a reception message falls within a first predetermined time from reception of a related message. When a reception time of a reception message falls within a first predetermined time from reception of a related message and a next related message is not received within a second predetermined time from the reception time, the reception message is output. Thereby, the message input/output device 20 suspends, when a reception time of a reception message falls within a first predetermined time from reception of a related message, output of the reception message. When a next related message is not received within a second predetermined time from the reception time, a latest reception message is output. Therefore, while output of a message is reduced, a final state of a message can be output.

Further, according to the present example embodiment, when output of a message is reduced, information indicating that output of a message is reduced and the number of output reductions are output. Thereby, also with regard to a message in which output is reduced, information thereof can be reported to a maintenance person.

Hardware Configuration Example

A configuration example of a hardware resource which implements, by use of one information processing device (computer), the message input/output device (10, 20) in each example embodiment of the present invention described above is described. Note that the message input/output device may be physically or functionally implemented by use of at least two information processing devices. Moreover, the message input/output device may be implemented as a dedicated device. Further, only some functions of the message input/output device may be implemented by use of an information processing device.

Figure 10:
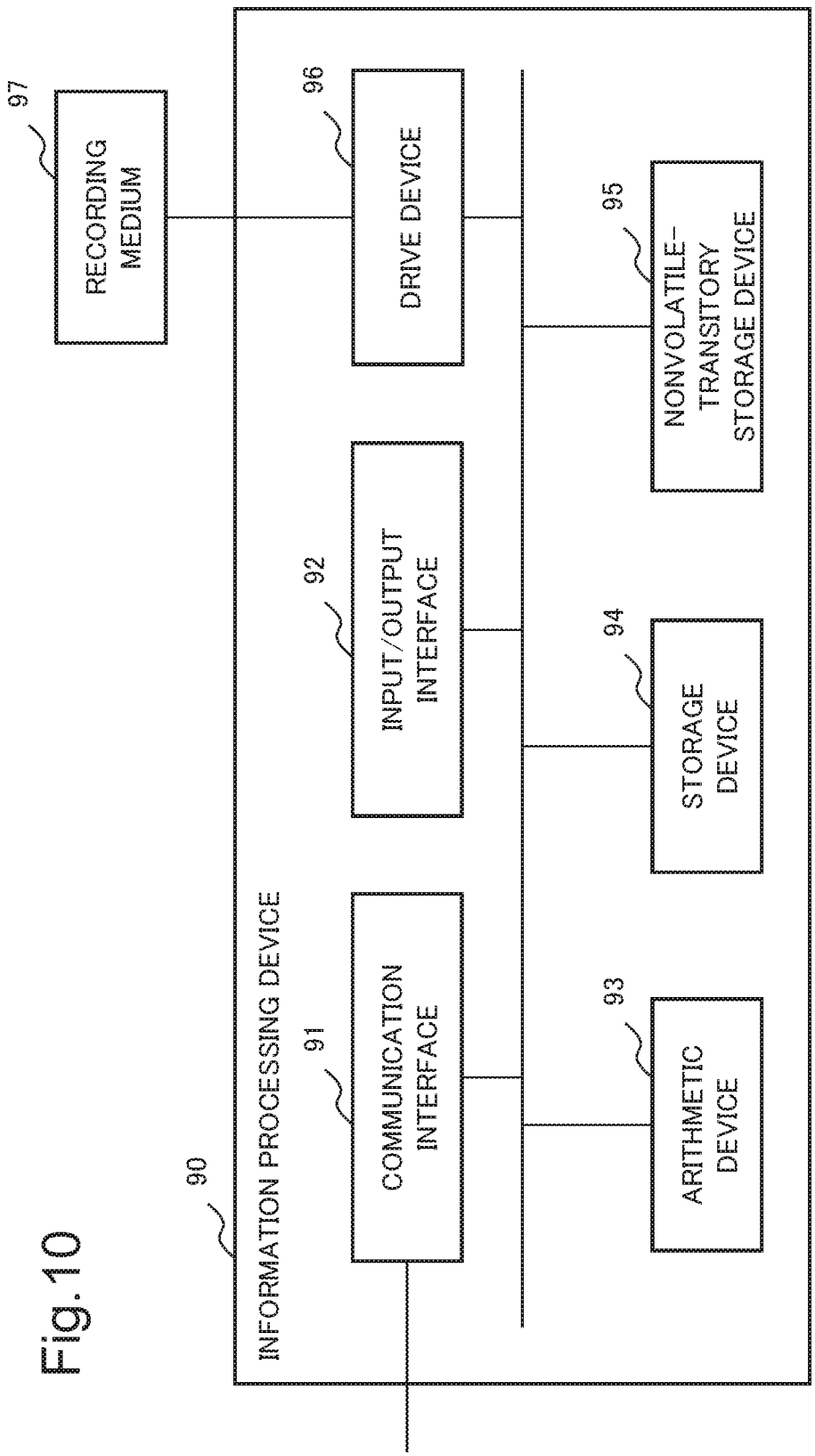
FIG. 10 shows a diagram illustrating a hardware configuration example of example embodiments of the present invention.
Figure 11:
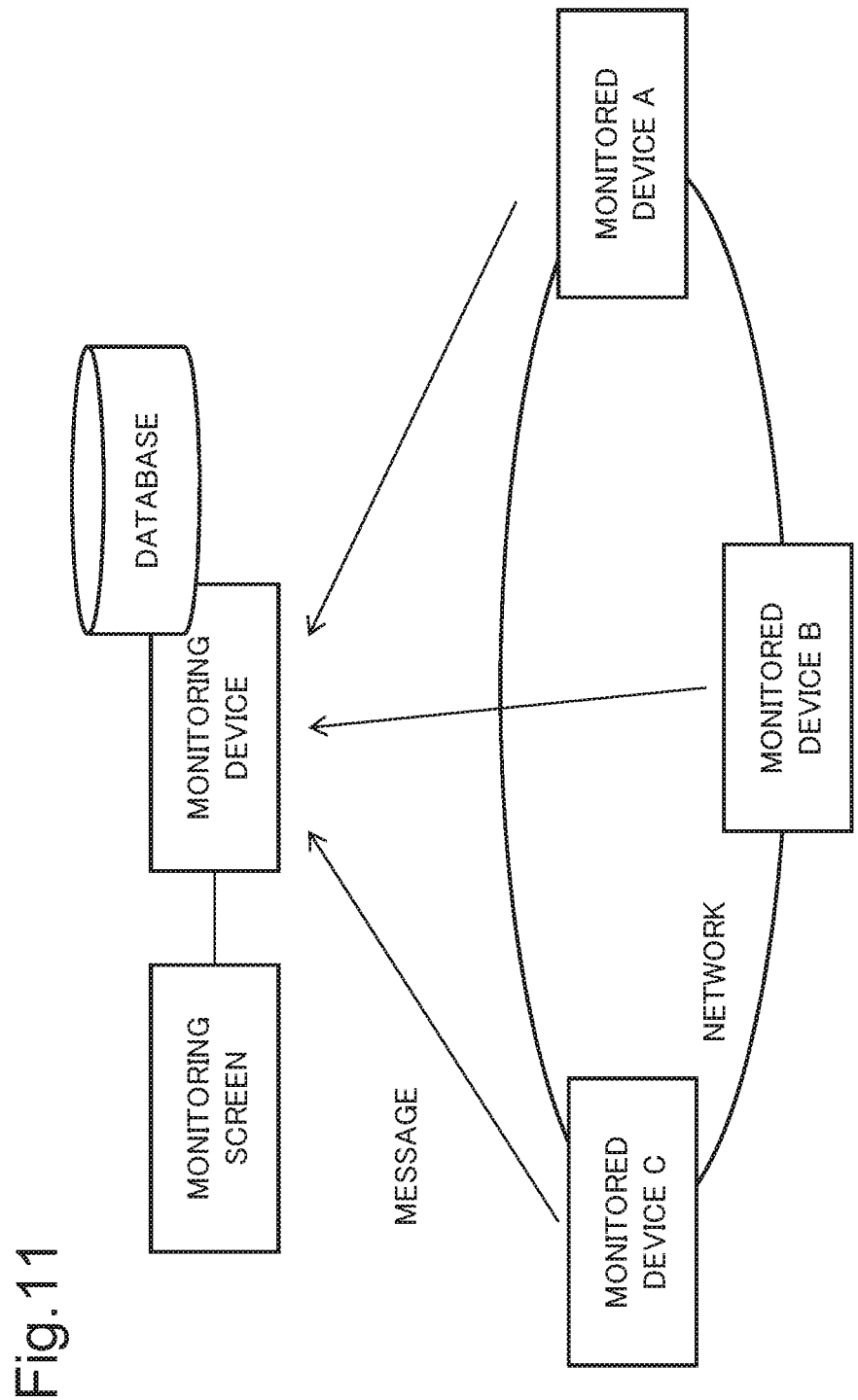
FIG. 11 shows a diagram illustrating a configuration example of a monitoring system.

FIG. 10 is a diagram schematically showing a hardware configuration example of an information processing device being capable of implementing the message input/output device in each example embodiment of the present invention. An information processing device 90 includes a communication interface 91, an input/output interface 92, an arithmetic device 93, a storage device 94, a non-volatile storage device 95, and a drive device 96.

The communication interface 91 is a communication means with which the message input/output device in each example embodiment communicates with an external device in a wired or wireless way. Note that, when the message input/output device is implemented by use of at least two information processing devices, the devices may be connected to each other in such a way as to be able to mutually communicate via the communication interface 91.

The input/output interface 92 is a man machine interface such as a keyboard being one example of an input device, or a display as an output device.

The arithmetic device 93 is an arithmetic processing device such as a general-purpose central processing unit (CPU) or a microprocessor. The arithmetic device 93 can read, for example, various programs stored in the non-volatile storage device 95, into the storage device 94, and execute processing in accordance with the read program.

The storage device 94 is a memory device such as a random access memory (RAM) which can be referred to from the arithmetic device 93, and stores a program, various data, and the like. The storage device 94 may be a volatile memory device.

The non-volatile storage device 95 is a non-volatile storage device such as a read only memory (ROM), a flash memory, or the like, and can store various programs, data, and the like.

The non-volatile storage device 95 is a non-volatile storage device such as a read only memory (ROM), a flash memory, or the like, and can store various programs, data, and the like.

The recording medium 97 is any recording medium such as an optical disk, a magneto-optical disk, a semiconductor flash memory or the like being capable of recording data.

Each example embodiment of the present invention may be implemented by, for example, configuring a message input/output device by the information processing device 90 exemplified in FIG. 10, and supplying this message input/output device with a program being capable of implementing a function described in each of the example embodiments described above.

In this case, the arithmetic device 93 executes the program supplied to the message input/output device, and thereby, an example embodiment can be implemented. Moreover, not all but some of the functions of the message input/output device can be configured by the information processing device 90.

Furthermore, the present invention may be configured in such a way that the program described above is recorded in the recording medium 97, and appropriately stored in the non-volatile storage device 95 at a shipment stage, an operation stage, or the like of the message input/output device. Note that, in this case, a method of installing the program described above into the message input/output device by utilizing a suitable jig at a manufacturing stage before shipment, an operation stage, or the like may be adopted as a method of supplying the program described above. Moreover, a general procedure such as a method of externally downloading the program described above via a communication line such as the Internet may be adopted as a method of supplying the program described above.

The whole or part of the example embodiments disclosed above can be described as, but not limited to, the following supplementary notes.

Supplementary Note 1

A message input/output device comprising:
a message reception means for receiving a reception message; and
an output means for outputting, when a reception time of the reception message falls within a first predetermined time from reception of a related message related to the reception message, the reception message when a next of the related message is not received within a second predetermined time exceeding the first predetermined time from the reception time.

Supplementary Note 2

The message input/output device according to supplementary note 1, wherein
the output means further outputs the reception message when the reception time of the reception message exceeds the first predetermined time from reception of the related message.

Supplementary Note 3

The message input/output device according to supplementary note 1 or 2, wherein
the output means further sets a reduction flag related to the reception message as "reduction done", the reduction flag indicating presence or absence of reduction of output of the reception message, when the reception time of the reception message falls within the first predetermined time from reception of the related message, and clears the reduction flag to "no reduction" after outputting, at a predetermined timing, a fact that output of the reception message is reduced, when the reduction flag is set as "reduction done".

Supplementary Note 4

The message input/output device according to any one of supplementary notes 1 to 3, wherein
the output means further adds 1 to a number of output reductions related to the reception message, when the reception time of the reception message falls within the first predetermined time from reception of the related message, and clears the number of output reductions to 0 after outputting the number of output reductions at a predetermined timing, when the reception message in which the number of output reductions is 1 or more exists.

Supplementary Note 5

The message input/output device according to any one of supplementary notes 1 to 4, wherein
the output means further outputs the reception message when the reception time of the reception message falls within the first predetermined time from reception of the related message and the related message having a same content as the reception message is not received in a period in which the related message is received at an interval of the first predetermined time or less.

Supplementary Note 6

The message input/output device according to any one of supplementary notes 1 to 5, further comprising:
a timer release means for releasing, when a timer that measures the second predetermined time of the related message related to the reception message is started, the timer when receiving the reception message; and
a timer start means for starting the timer of the related message when the reception time of the reception message falls within the first predetermined time from reception of the related message, wherein
the output means outputs the reception message when the timer is timed out.

Supplementary Note 7

A message input/output method comprising:
receiving a reception message; and
outputting, when a reception time of the reception message falls within a first predetermined time from reception of a related message related to the reception message, the reception message when a next of the related message is not received within a second predetermined time exceeding the first predetermined time from the reception time.

Supplementary Note 8

The message input/output method according to supplementary note 7, further comprising
outputting the reception message when the reception time of the reception message exceeds the first predetermined time from reception of the related message.

Supplementary Note 9

The message input/output method according to supplementary note 7 or 8, further comprising:
setting a reduction flag related to the reception message as "reduction done", the reduction flag indicating presence or absence of reduction of output of the reception message, when the reception time of the reception message falls within the first predetermined time from reception of the related message; and
clearing the reduction flag to "no reduction" after outputting, at a predetermined timing, a fact that output of the reception message is reduced, when the reduction flag is set as "reduction done".

Supplementary Note 10

The message input/output method according to any one of supplementary notes 7 to 9, further comprising:
adding 1 to a number of output reductions related to the reception message, when the reception time of the reception message falls within the first predetermined time from reception of the related message; and
clearing the number of output reductions to 0 after outputting the number of output reductions at a predetermined timing, when the reception message in which the number of output reductions is 1 or more exists.

Supplementary Note 11

The message input/output method according to any one of supplementary notes 7 to 10, further comprising outputting the reception message when the reception time of the reception message falls within the first predetermined time from reception of the related message and the related message having a same content as the reception message is not received in a period in which the related message is received at an interval of the first predetermined time or less.

Supplementary Note 12

The message input/output method according to any one of supplementary notes 7 to 11, further comprising:
releasing, when a timer that measures the second predetermined time of the related message related to the reception message is started, the timer when receiving the reception message;
starting the timer of the related message when the reception time of the reception message falls within the first predetermined time from reception of the related message; and
outputting the reception message when the timer is timed out.

Supplementary Note 13

A computer readable recording medium recorded with a message input/output program causing a computer to execute:
a message reception function of receiving a reception message; and
an output function of outputting, when a reception time of the reception message falls within a first predetermined time from reception of a related message related to the reception message, the reception message when a next of the related message is not received within a second predetermined time exceeding the first predetermined time from the reception time.

Supplementary Note 14

The computer readable recording medium recorded with the message input/output program according to supplementary note 13, wherein
the output function further outputs the reception message when the reception time of the reception message exceeds the first predetermined time from reception of the related message.

Supplementary Note 15

The computer readable recording medium recorded with the message input/output program according to supplementary note 13 or 14, wherein
the output function further sets a reduction flag related to the reception message as "reduction done", the reduction flag indicating presence or absence of reduction of output of the reception message, when the reception time of the reception message falls within the first predetermined time from reception of the related message, and clears the reduction flag to "no reduction" after outputting, at a predetermined timing, a fact that output of the reception message is reduced, when the reduction flag is set as "reduction done".

Supplementary Note 16

The computer readable recording medium recorded with the message input/output program according to any one of supplementary notes 13 to 15, wherein
the output function further adds 1 to a number of output reductions related to the reception message, when the reception time of the reception message falls within the first predetermined time from reception of the related message, and clears the number of output reductions to 0 after outputting the number of output reductions at a predetermined timing, when the reception message in which the number of output reductions is 1 or more exists.

Supplementary Note 17

The computer readable recording medium recorded with the message input/output program according to any one of supplementary notes 13 to 16, wherein
the output function further outputs the reception message when the reception time of the reception message falls within the first predetermined time from reception of the related message and the related message having a same content as the reception message is not received in a period in which the related message is received at an interval of the first predetermined time or less.

Supplementary Note 18

The computer readable recording medium recorded with the message input/output program according to any one of supplementary notes 13 to 17, the program further causing the computer to execute:
a timer release function of releasing, when a timer that measures the second predetermined time of the related message related to the reception message is started, the timer when receiving the reception message; and
a timer start function of starting the timer of the related message when the reception time of the reception message falls within the first predetermined time from reception of the related message, wherein
the output function outputs the reception message when the timer is timed out.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-151500, filed on Aug. 4, 2017, the disclosure of which is incorporated herein in its entirety by reference.

REFERENCE SIGNS LIST

10, 20 Message input/output device
11 Message reception unit
12 Output unit
23 Timer release unit
24 Timer start unit
40 Display device
50 Database
60 Monitored device
90 Information processing device
91 Communication interface
92 Input/output interface
93 Arithmetic device
94 Storage device
95 Nonvolatile storage device
96 Drive device
97 Recording medium

What is claimed is:

1. A message input/output device comprising one or more memories storing instructions and one or more processors configured to execute the instructions to:
receive a reception message; and
output when a reception time of the reception message falls within a first predetermined time from reception of a related message related to the reception message, the reception message when a next of the related message is not received within a second predetermined time exceeding the first predetermined time from the reception time.

2. The message input/output device according to claim 1, wherein
the one or more processors configured to execute the instructions to output the reception message when the reception time of the reception message exceeds the first predetermined time from reception of the related message.

3. The message input/output device according to claim 1, wherein
the one or more processors configured to execute the instructions to set a reduction flag related to the reception message as "reduction done", the reduction flag indicating presence or absence of reduction of output of the reception message, when the reception time of the reception message falls within the first predetermined time from reception of the related message, and clear the reduction flag to "no reduction" after outputting, at a predetermined timing, a fact that output of the reception message is reduced, when the reduction flag is set as "reduction done".

4. The message input/output device according to claim 1, wherein
the one or more processors configured to execute the instructions to add 1 to a number of output reductions related to the reception message, when the reception time of the reception message falls within the first predetermined time from reception of the related message, and clear the number of output reductions to 0 after outputting the number of output reductions at a predetermined timing, when the reception message in which the number of output reductions is 1 or more exists.

5. The message input/output device according to claim 1, wherein
the one or more processors configured to execute the instructions to output the reception message when the reception time of the reception message falls within the first predetermined time from reception of the related message and the related message having a same content as the reception message is not received in a period in which the related message is received at an interval of the first predetermined time or less.

6. The message input/output device according to claim 1, wherein:
the one or more processors configured to execute the instructions to
release, when a timer that measures the second predetermined time of the related message related to the reception message is started, the timer when receiving the reception message,
start the timer of the related message when the reception time of the reception message falls within the first predetermined time from reception of the related message, and
output the reception message when the timer is timed out.

7. A message input/output method comprising:
receiving a reception message; and
outputting, when a reception time of the reception message falls within a first predetermined time from reception of a related message related to the reception message, the reception message when a next of the related message is not received within a second predetermined time exceeding the first predetermined time from the reception time.

8. The message input/output method according to claim 7, further comprising
outputting the reception message when the reception time of the reception message exceeds the first predetermined time from reception of the related message.

9. The message input/output method according to claim 7, further comprising:
setting a reduction flag related to the reception message as "reduction done", the reduction flag indicating presence or absence of reduction of output of the reception message, when the reception time of the reception message falls within the first predetermined time from reception of the related message; and
clearing the reduction flag to "no reduction" after outputting, at a predetermined timing, a fact that output of the reception message is reduced, when the reduction flag is set as "reduction done".

10. The message input/output method according to claim 7, further comprising:
adding 1 to a number of output reductions related to the reception message, when the reception time of the reception message falls within the first predetermined time from reception of the related message; and
clearing the number of output reductions to 0 after outputting the number of output reductions at a predetermined timing, when the reception message in which the number of output reductions is 1 or more exists.

11. The message input/output method according to claim 7, further comprising
outputting the reception message when the reception time of the reception message falls within the first predetermined time from reception of the related message and the related message having a same content as the reception message is not received in a period in which the related message is received at an interval of the first predetermined time or less.

12. The message input/output method according to claim 7, further comprising:
releasing, when a timer that measures the second predetermined time of the related message related to the reception message is started, the timer when receiving the reception message;
starting the timer of the related message when the reception time of the reception message falls within the first predetermined time from reception of the related message; and
outputting the reception message when the timer is timed out.

13. A non-transitory computer readable recording medium recorded with a message input/output program causing a computer to execute:
a message reception function of receiving a reception message; and
an output function of outputting, when a reception time of the reception message falls within a first predetermined time from reception of a related message related to the reception message, the reception message when a next of the related message is not received within a second predetermined time exceeding the first predetermined time from the reception time.

14. The non-transitory computer readable recording medium recorded with the message input/output program according to claim 13, wherein
the output function further outputs the reception message when the reception time of the reception message exceeds the first predetermined time from reception of the related message.

15. The non-transitory computer readable recording medium recorded with the message input/output program according to claim 13, wherein
the output function further sets a reduction flag related to the reception message as "reduction done", the reduction flag indicating presence or absence of reduction of output of the reception message, when the reception time of the reception message falls within the first predetermined time from reception of the related message, and clears the reduction flag to "no reduction" after outputting, at a predetermined timing, a fact that output of the reception message is reduced, when the reduction flag is set as "reduction done".

16. The non-transitory computer readable recording medium recorded with the message input/output program according to claim 13, wherein
the output function further adds 1 to a number of output reductions related to the reception message, when the reception time of the reception message falls within the first predetermined time from reception of the related message, and clears the number of output reductions to 0 after outputting the number of output reductions at a predetermined timing, when the reception message in which the number of output reductions is 1 or more exists.

17. The non-transitory computer readable recording medium recorded with the message input/output program according to claim 13, wherein
the output function further outputs the reception message when the reception time of the reception message falls within the first predetermined time from reception of the related message and the related message having a same content as the reception message is not received in a period in which the related message is received at an interval of the first predetermined time or less.

18. The non-transitory computer readable recording medium recorded with the message input/output program according to claim 13, the program further causing the computer to execute:
a timer release function of releasing, when a timer that measures the second predetermined time of the related message related to the reception message is started, the timer when receiving the reception message; and
a timer start function of starting the timer of the related message when the reception time of the reception message falls within the first predetermined time from reception of the related message, wherein
the output function outputs the reception message when the timer is timed out.

* * * * *